United States Patent
Salowey et al.

(10) Patent No.: US 8,015,594 B2
(45) Date of Patent: Sep. 6, 2011

(54) TECHNIQUES FOR VALIDATING PUBLIC KEYS USING AAA SERVICES

(75) Inventors: Joseph Salowey, Seattle, WA (US); Jan Vilhuber, Las Vegas, NV (US)

(73) Assignee: Cisco Technology, Inc., San Jose, CA (US)

( * ) Notice: Subject to any disclaimer, the term of this patent is extended or adjusted under 35 U.S.C. 154(b) by 1562 days.

(21) Appl. No.: 11/378,577

(22) Filed: Mar. 17, 2006

(65) Prior Publication Data

US 2007/0220589 A1    Sep. 20, 2007

(51) Int. Cl.
*H04L 29/06* (2006.01)
(52) U.S. Cl. .......................................... 726/3; 713/168
(58) Field of Classification Search .................. None
See application file for complete search history.

(56) References Cited

U.S. PATENT DOCUMENTS

| | | | |
|---|---|---|---|
| 6,219,790 B1 * | 4/2001 | Lloyd et al. | 726/14 |
| 6,728,536 B1 | 4/2004 | Basilier et al. | |
| 6,769,000 B1 | 7/2004 | Akhtar et al. | |
| 6,839,338 B1 | 1/2005 | Amara et al. | |
| 6,856,800 B1 * | 2/2005 | Henry et al. | 455/411 |
| 6,879,690 B2 | 4/2005 | Faccin et al. | |
| 6,915,345 B1 | 7/2005 | Tummala et al. | |
| 6,996,714 B1 | 2/2006 | Halasz et al. | |
| 7,171,555 B1 * | 1/2007 | Salowey et al. | 713/156 |
| 7,370,350 B1 * | 5/2008 | Salowey | 726/7 |
| 2002/0118674 A1 | 8/2002 | Faccin et al. | |
| 2002/0120844 A1 | 8/2002 | Faccin et al. | |
| 2002/0174335 A1 | 11/2002 | Zhang et al. | |
| 2005/0021781 A1 * | 1/2005 | Sunder et al. | 709/229 |

OTHER PUBLICATIONS

PKI Integration with AAA Server, Cisco Systems, 2003.*
Aboba et al., RFC 2716—PPP EAP TLS Authentication Protocol, Oct. 1999.*
Aboba, A. et al., "PPP EAP TLS Authentication Protocol", obtained from http://www.ietf.org/rfc/rfc2716.txt, 23 pages, Oct. 1999.

* cited by examiner

*Primary Examiner* — Minh Dinh
(74) *Attorney, Agent, or Firm* — Fish & Richardson P.C.

(57) ABSTRACT

Techniques for validating a first device are provided. A second device receives a first device public key and first device identification information from the first device. Validation of the first device identification information is required for a security process using a security protocol. The second device sends the first device public key and the first device identification information to an AAA server for validation. The AAA server is separate from the second device. The second device receives a response from the AAA server, the response including an indication whether the received first device identification information is validated with stored first device identification information for the first device public key. If the first device identification information is validated, an action for the security process is performed using the security protocol.

25 Claims, 5 Drawing Sheets

TECHNIQUES FOR VALIDATING PUBLIC KEYS USING AAA SERVICES

BACKGROUND OF THE INVENTION

Embodiments of the present invention generally relate to telecommunications and more specifically to techniques for validating public keys using AAA services for a security protocol.

Security protocols, such as the secure shell (SSH) protocol, are used to allow secure access to devices, such as routers, hosts, etc. The security protocols are used to form protected channels in which data can be exchanged between devices in a secure manner. The SSH protocol uses public keys to authenticate both servers and clients. However, SSH does not support a standard mechanism for the use of a public key infrastructure to authenticate the public keys. Thus, when a client or server wishes to validate a public key, the client or server needs to have a local copy of the public key that is bound to any other information needed to validate the key, such as an identity and any authorizations for the identity. Maintaining all of this information locally is a manual and tedious process. For example, lists of identities and public keys need to be created and further maintained for each client and server. This does not scale well when lists have to be maintained on many clients and servers.

The public key infrastructure can use a certificate authority to streamline the validation process. For example, a centralized certificate authority (CA) may use a CA certificate to sign a public key that has been bound to an identity. The certificate authority then issues a certificate that includes the binding. When this certificate is presented to an entity, only the public key for the certificate authority is needed to validate the certificate. It is then assumed that the public key in the certificate can be trusted. This is because if the entity trusts the certificate authority, then validating the certificate with the public key of the certificate authority is considered valid. However, this process includes many disadvantages. For example, some security protocols, such as SSH, do not support the use of a certificate authority in a standard way. Further, some business entities are not set up to use a certificate authority and the set up to provide support for a certificate authority may include extra processes that need to be configured and also may be costly.

DETAILED DESCRIPTION OF EMBODIMENTS OF THE INVENTION

Figure 1:
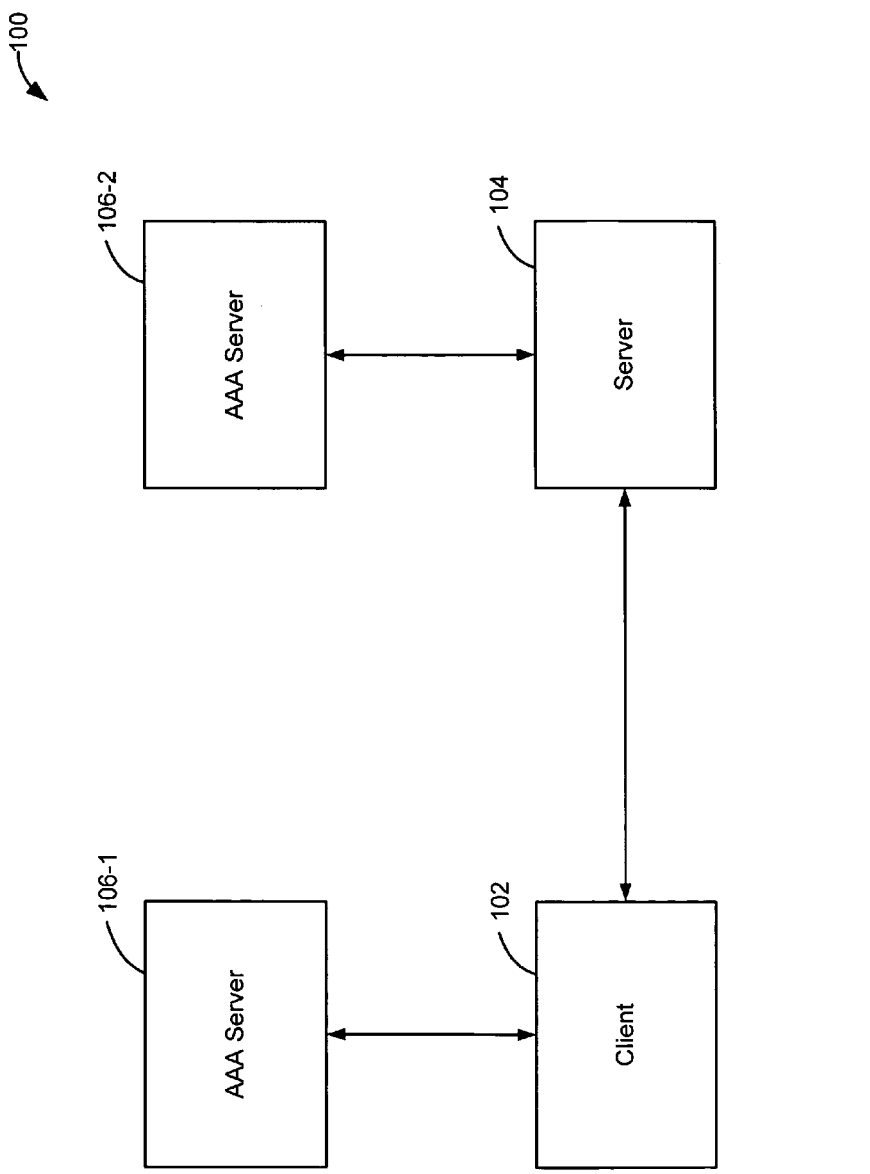
FIG. 1 depicts a system for using AAA services to validate public keys according to one embodiment of the present invention.

FIG. 1 depicts a system 100 for using authentication, authorization, and accounting (AAA) services to validate public keys according to one embodiment of the present invention. As shown, system 100 includes a client 102, a server 104, an AAA server 106-1, and an AAA server 106-2. Although the above components are shown, it will be understood that any number of components shown in system 100 may be provided, and variations may be appreciated.

Client 102 may be any computing device that desires to communicate with server 104 securely. For example, client 102 may be a host computer being used by a user. In one embodiment, client 102 may desire secure access to server 104. When secure access is enabled, client 102 may perform actions, such as a user may want to log into server 104 over a network and execute commands in server 104, such as moving files to server 104, etc. A person skilled in the art will appreciate other actions that may be desired.

Client 102 is configured to send a request using a security protocol. In one embodiment, the security protocol may use public/private key pairs for validation. The security protocol may include secure shell (SSH), SSH file transfer protocol (SFTP), transport layer security (TLS), secure sockets layer (SSL), Internet key exchange (IKE), etc.

Server 104 includes any device in which secure communication is desired. For example, server 104 may be a web server, router, host, computer, etc. Server 104 may validate client 102 to allow the secure communication.

AAA server 106 may provide AAA services. In one embodiment, AAA services include validation. Validation, as used, may include authentication, authorization, and/or accounting. It will be understood that embodiments of the present invention may require any combination of the above services. For example, authentication and authorization may be requested but not accounting. It will be understood that validation may also include other services, such as any services requested by a user's preferences. Validation is used to allow the secure communication to proceed where client 102 and server 104 may reasonably trust each other.

In one embodiment, authentication is the verification of the identity of client 102 (or a user). For example, the authentication of the identity proves that a user is really who they say they are.

Authorization may be determining any actions that a client is allowed to perform (has rights to). For example, which resources client 102 is allowed to access, what the privilege level of client 102 is, and any other authorization characteristics may be provided.

Accounting services record information about client 102, such as what client 102 actually did, what was accessed, how long it was accessed, etc., for accounting, billing and auditing purposes. Accounting can also track how resources were used and auditing can be used to track network access and detect network intrusions. The following description discusses authentication and authorization but it will be understood that accounting services can also be requested using embodiments of the present invention.

Client 102 and server 104 may enter into a security transaction using a security protocol. For example, client 102 may request secure access to server 104 using a security protocol, such as SSH. During this exchange, both client 102 and server 104 may present their own public keys. Also, other information that is used to determine authentication and authorization information may be provided, such as identity information. For example, server 104 may present its public key and other information, such as identity information, to client 102, which then can use AAA server 106-1 to validate server 104. In one embodiment, the protocol used to send requests to AAA server 106 includes a remote access dial-in user service (RADIUS) protocol, a terminal access controller access control system plus (TACACS+) protocol, or any other AAA protocol. AAA server 106 may be any device configured to provide AAA services. It will be recognized that AAA server 106 may perform other functions in addition to providing AAA services.

In one embodiment, client 102 and server 104 do not need to have a public key validation infrastructure locally. The public key infrastructure is used to validate public keys locally at client 102 or server 104. Although the infrastructure may be remote, it will be recognized that client 102 and server 104 may store their own private/public key pairs. The public key validation infrastructure may be provided remotely at AAA server 106-1. Also, the infrastructure for a certificate authority may not be needed at client 102 or server 104. Rather, AAA services can be used to validate public keys.

Figure 2:
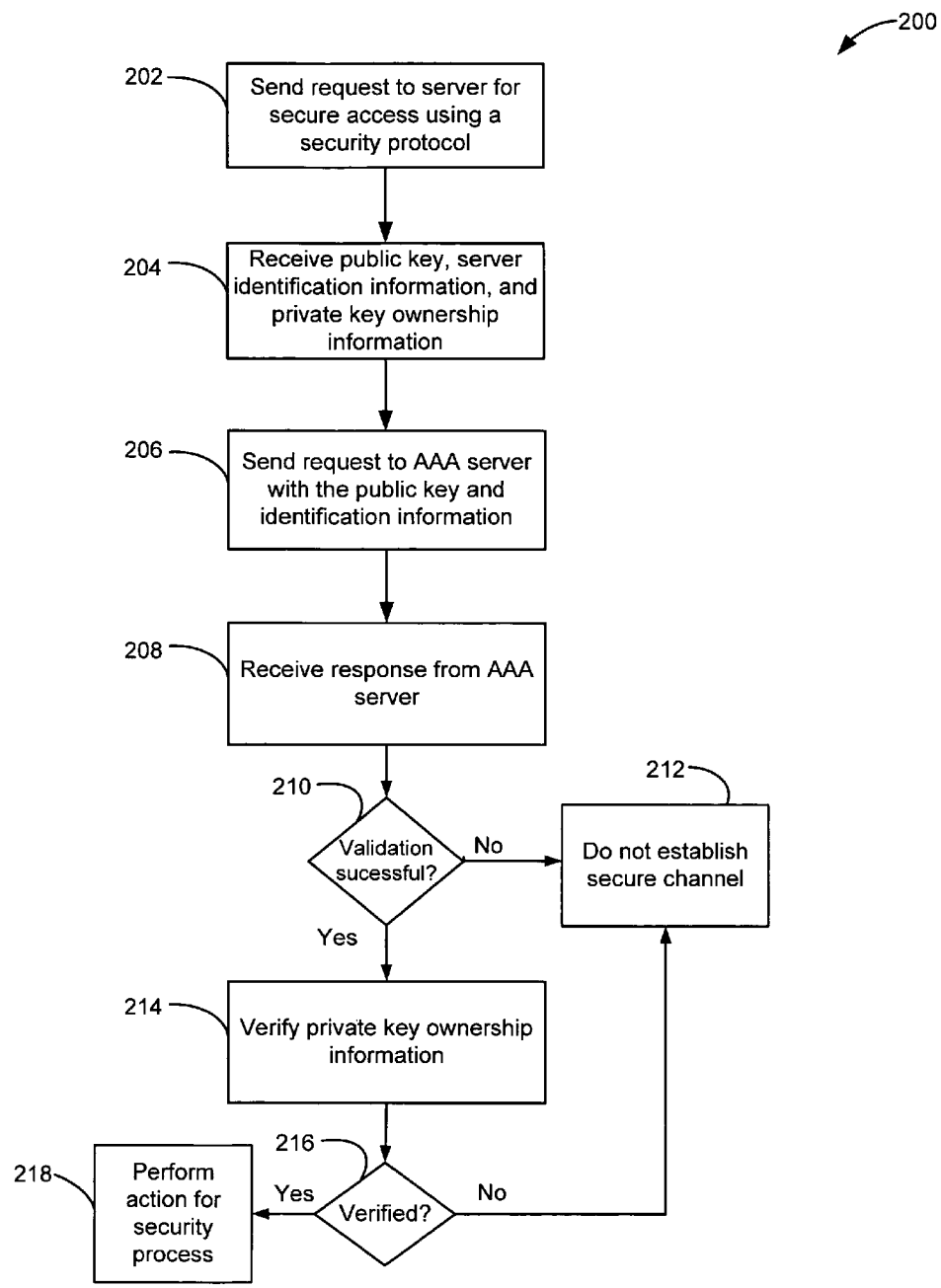
FIG. 2 depicts a simplified flowchart of a method for validating a server's public key according to one embodiment of the present invention.
Figure 3:
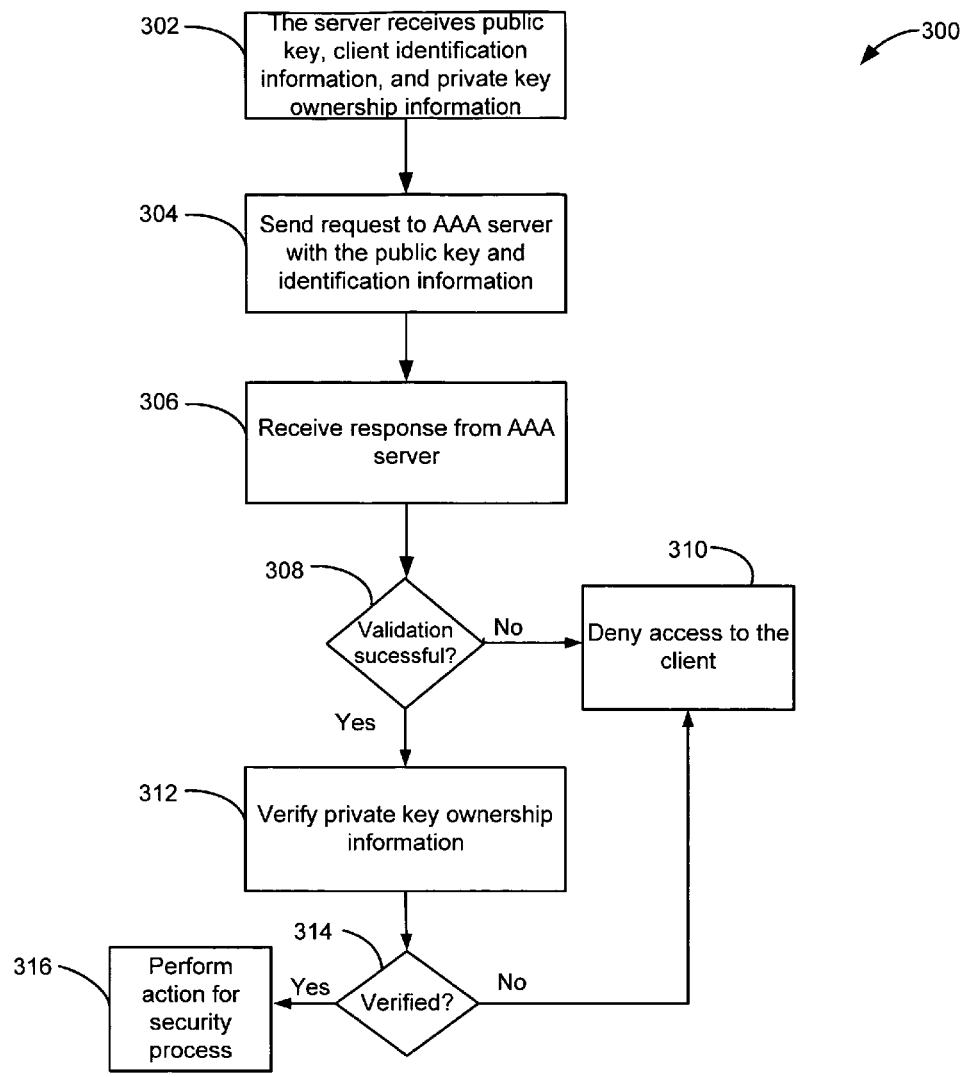
FIG. 3 depicts a simplified flow chart of a method for validating a client according to one embodiment of the present invention.

FIGS. 2 and 3 show a security transaction where client 102 validates server 104, and then server 104 validates client 102. In one example, server 104 is a key presenter and client 102 is a key validator. The key presenter is an entity that presents their public key for validation and the key validator is the entity that validates the public key. In another example, client 102 is a key presenter and server 104 is a key validator. It will be understood that embodiments of the present invention are not limited to using both the client validation and the server validation. For example, a client may just validate a server, a server may just validate a client, etc. Embodiments of the present invention broadly allow a device to validate a public key using AAA services.

FIG. 2 depicts a simplified flowchart 200 of a method for validating a server's public key according to one embodiment of the present invention. In step 202, client 102 sends a request to server 104 for secure access. For example, the security protocol may be SSH. This request may include a registration process in which it is determined how to establish session-level security or transport-level security. For example, an exchange may be performed between client 102 and server 104 to determine how to authenticate server 104 and also how to exchange public keys between server 104 and client 102. In this exchange, it may be determined that SSH should be used. A person skilled in the art will appreciate how the registration process is performed.

In step 204, client 102 receives a public key from server 104, server identification information, and private key ownership information. The public key may be any public key as known in the art. Also, the identification information may be any information that identifies server 104. For example, the identification information may be a username, host name, etc. The private key ownership information may be any information that shows that server 104 is in possession of the private key that is associated with the public key. The exchange of the public key, server identification information, and private key ownership information may be sent using any security key exchange protocol, such as a SSH key exchange protocol or a user authentication protocol.

Step 206 sends a request to AAA server 106-1 with the public key and the identification information. Other information may also be sent, such as authorization information requesting a type of access. The request may be sent using any AAA protocol, such as RADIUS. For example, the request may be sent in a RADIUS access-request message. The RADIUS access-request message may include additional fields that store the public key and identification information as attributes. For example, the access-request message may include a public key attribute, an identification information attribute, an authorization attribute indicating what type of access is desired, and other attributes.

The request may include a fingerprint or hash of the public key. Thus, the entire public key does not need to be sent. A one-way hash of the public key may be taken to create a fingerprint. The fingerprint may then be sent to AAA server 106-1. A fingerprint is a smaller representation of the public key but is reasonably unique. A person skilled in the art will appreciate how to use a fingerprint in lieu of a public key. It will be recognized that methods of sending information in lieu of a public key will be appreciated. Also, when it is described as sending a public key, this may mean that a portion of the public key, a fingerprint of the public key, a hash of the public key, or any other representation of the public key may be sent.

In step 208, client 102 receives a response from AAA server 106-1. The processing performed by AAA server 106-1 will be described in more detail below. The response may indicate whether the validation was successful or unsuccessful. For example, if the validation is unsuccessful, a RADIUS access-reject packet may be sent, and if the validation was successful, a RADIUS access-accept message may be sent.

The response may also include any authorizations for server 104. These authorizations may include the roles the server is allowed to perform in or the type of data it is allowed to receive. For example, responses for the type of access may be provided, such as a certain level of access if granted. Further, a cache time that indicates the amount of time that the information in the access-accept message can be cached. This indicates an amount of time the validation may be valid.

In step 210, it is determined if the validation was successful. In step 212, if the validation was not successful, a secure channel is not established between client 102 and server 104. Although the above action is being described, it will be recognized that any action may be taken if the validation is not successful. For example, a reject message may be sent to server 104 with the reason for the rejection.

In step 214, if the validation was successful, client 102 verifies the private key ownership information. A person skilled in the art will appreciate how client 102 can verify the private key ownership information. The verification ensures that server 104 is indeed in possession of the private key.

In another embodiment, client 102 may verify the private key ownership information before sending the public key to AAA server 106-1. In this embodiment, the request is not sent to AAA server 106-1 if the private key is not verified. However, validating the public key first keeps client 102 from wasting time with complex calculations if the public key is not valid. This may be a trade off between consuming resources on AAA server 106 versus client 102.

Step 216 determines if the private key ownership information is verified. If not, the secure channel is not established as described in step 212.

If the private key ownership information is verified, step 218 performs an action for the security request. For example, an encrypted channel may be established between client 102 and server 104. Although the above action is described, it will be understood that any other action may be taken. For example, other actions may also include sending, from client 102, sensitive data to server 104 for processing or asking server 104 to perform operations on its behalf.

After server 104 is validated at client 102, then server 104 validates client 102. FIG. 3 depicts a simplified flow chart 300 of a method for validating client 102 according to one embodiment of the present invention. In step 302, server 104 receives a public key, client identification information, and client private key ownership information from client 102.

In step 304, server 104 sends a request to AAA server 106-2 with the public key information and client identification information. The request may be sent as described with respect to step 206 in FIG. 2.

In step 306, a response is received from AAA server 106-2. The response may indicate whether the validation was successful or unsuccessful. The response may include an indication whether client 102 was authenticated, include any authorizations for client 102, and any other information. For example, a cache time may be provided.

In step 308, it is determined if the validation was successful. In step 310, if the validation was not successful, server 104 denies access to client 102. Although the above action is described, it will be understood that any other action may be taken. For example, a message may be sent to client 102 indicating that validation was denied.

In step 312, if the validation was successful, server 104 verifies the client private key ownership information for client 102. This process may be the same as described with respect to step 214 of FIG. 2. Also, as discussed above, client 102 may verify the private key before sending the public key to AAA server 106-1.

Step 314 determines if the private key ownership information is verified. If not, client 102 is denied access as described in step 310.

If the private key ownership information was verified, in step 316, server 104 performs an action for the security request. For example, server 104 allows secure access for client 102. Although the above action is described, it will be understood that other actions may be taken. For example, for any authorizations that are returned, the access may be tailored to those authorizations. Certain resources may be restricted for access by client 102, certain privilege levels may be applied to the access, certain rights may be applied to the access, etc.

Figure 4:
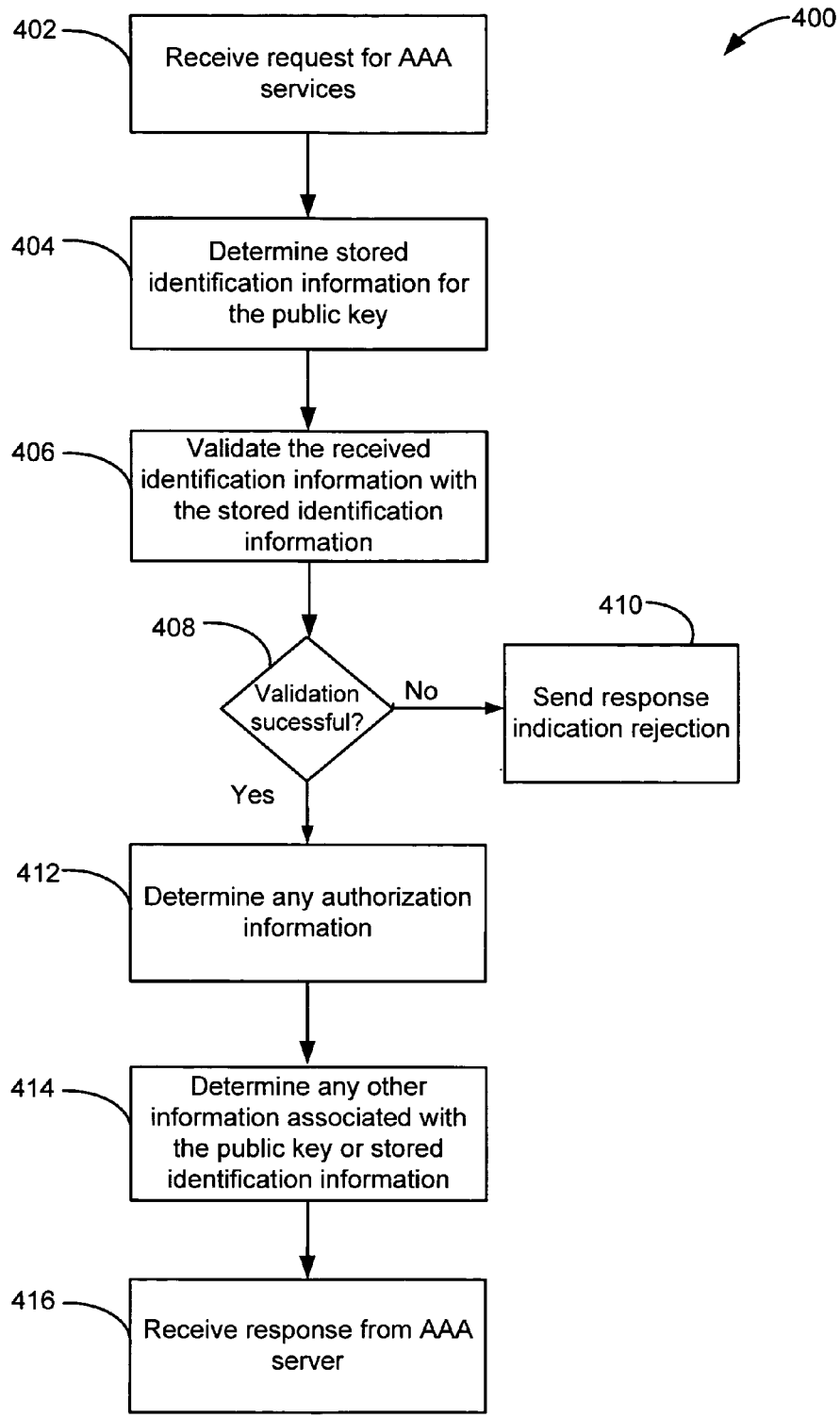
FIG. 4 depicts a simplified flow chart of a method for validating an entity (e.g., a client or server) using an AAA server according to one embodiment of the present invention.

The following describes a process taken by AAA server 106-1 or AAA server 106-2 when a request for AAA services is received according to one embodiment of the present invention. FIG. 4 depicts a simplified flow chart 400 of a method for validating an entity (e.g., client 102 or server 104) using AAA server 106 according to one embodiment of the present invention. In step 402, AAA server 106 receives a request for AAA services. The request may be received from client 104 and/or server 104. The request may include the public key and also identification information.

In step 404, AAA server 106 determines stored identification information for the public key. For example, a database may be accessed that includes stored identification information for a number of entities. The stored identification information may be indexed by unique information for each entity. For example, the index may be the public key, a username, public key fingerprint, etc.

In step 406, AAA server 106 validates the received identification information with the stored identification information. The verification of the received identification information to the stored identification information may be determined using a table look-up/database look-up. For example, an index may be used to determine the stored identification information. The index may be a username, public key fingerprint, public key, or any other information that is reasonably unique. AAA server 106 may compare the stored identification information to the identification information sent in the request to determine if they correspond or match. Thus, it is determined whether the identification provided by an entity matches the identification information that has been bound to the public key as stored in the database at AAA server 106.

In step 408, it is determined if the identification information sent in the request is verified. If it is not verified, then a response is sent indicating the rejection of the identification information in step 410. For example, a RADIUS access-reject packet may be sent.

If it is verified, in step 412, AAA server 106 determines any authorization information for the stored identification information and/or public key. For example, the AAA server 106 may return a cache time that indicates the amount of time that the information in the access-accept message can be cached. This indicates an amount of time the authorization may be valid. Also, examples of authorizations may be what resources that can be accessed, a privilege level, and any other rights.

In step 414, AAA server 106 determines any other information associated with the public key or stored identification information. For example, a profile may be stored for the identification information. The profile information may indicate user preferences, such as which local account to use on client 102 or server 104.

In step 416, AAA server 106 sends the response with the information determined in steps 412 and 414.

Client 102 or server 104 may cache the information returned from the AAA server 106 in step 416 for a period of time specified in the response to avoid making additional requests of the AAA server 106 while the returned information is still valid.

Figure 5:
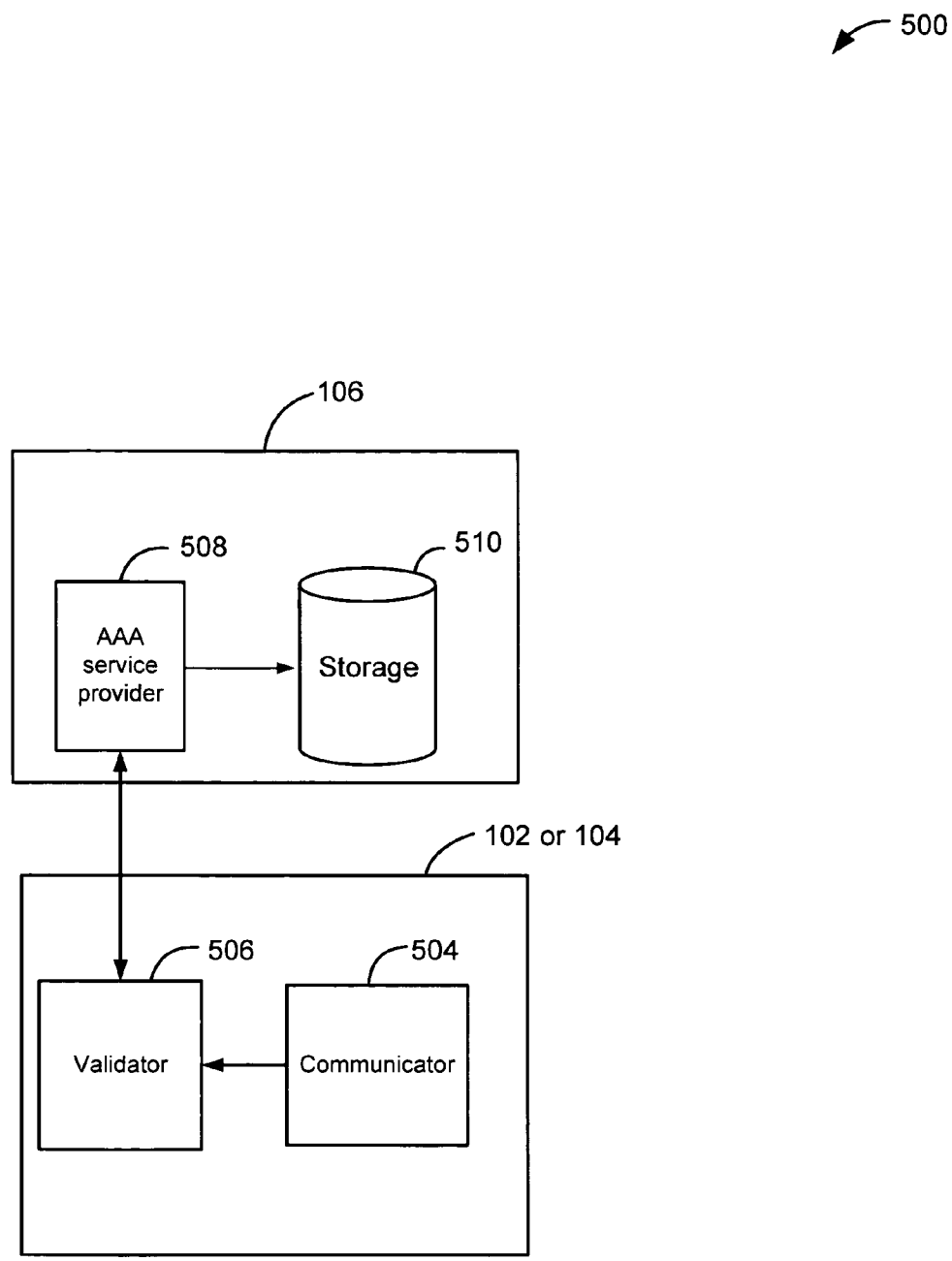
FIG. 5 depicts simplified block diagram of an entity and AAA server according to one embodiment of the present invention.

FIG. 5 depicts simplified block diagram 500 of an entity 402 and AAA server 106 according to one embodiment of the present invention. Components of entity 402 and AAA server 106 may be implemented in software, hardware, or any combination thereof.

Entity 402 may be client 102 and/or server 104 in one embodiment, or any other entity that requires AAA services. As shown, a public key is received at a communicator 504. Communicator 504 is configured to verify private key information for the public key. Also, a validator 506 is configured to send a request to AAA server 106 with the public key and identification information.

AAA server 106 includes an AAA service provider 508 that is configured to authenticate the received identification information and public key. For example, database 510 may be accessed to retrieve stored identification information. The stored identification information may be indexed in any way. For example, bindings between the identification information and the public keys may be stored where the public key is used as an index. Also, database 510 may also include any other information, such as authorization information and profile information that may be indexed using the identification information. Although database 510 is shown as being part of AAA server 106, it will be recognized that database 510 may be separate from but accessible to AAA server 106.

AAA service provider 508 then sends a response back to validator 506. Validator 506 then performs an action based on the response as described above.

Embodiments of the present invention provide many advantages. For example, public key and identification information is not required to be stored at client 102 or server 104. Rather, the storage is centralized in an AAA server 106. The identification information to public key binding is also centrally managed. This alleviates manually creating and maintaining a list of public keys to identification information bindings.

Further, authorizations are centrally managed in an AAA server 106. AAA server 106 can also provide additional features, such as authorization support.

Further, the AAA services provided may be scaled to support additional protocols. For example, SSH support may be provided in addition to SSH file transfer protocol (SFTP), transport layer security (TLS), secure sockets layer (SSL), internet key exchange (IKE), etc.

Although the invention has been described with respect to specific embodiments thereof, these embodiments are merely illustrative, and not restrictive of the invention. For example, the client/server environment may be replaced with a single device that requires AAA services, a network of devices may be used, etc.

Any suitable programming language can be used to implement the routines of embodiments of the present invention including C, C++, Java, assembly language, etc. Different programming techniques can be employed such as procedural or object oriented. The routines can execute on a single processing device or multiple processors. Although the steps, operations, or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain and store the program for use by or in connection with the instruction execution system, apparatus, system or device. The computer-readable medium can be, by way of example only but not by limitation, a semiconductor system, apparatus, system, device, or computer memory.

Embodiments of the present invention can be implemented in the form of control logic in software or hardware or a combination of both. The control logic may be stored in an information storage medium, such as a computer-readable medium, as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

A "processor" or "process" includes any hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of embodiments of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", an and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

We claim:

1. A first device configured to perform a validation process for a second device, the first device comprising:
   one or more processors; and
   logic encoded in one or more tangible media for execution by the one or more processors, and when executed operable to:
      receive a second device public key, second device private key ownership information, and second device identification information from the second device, wherein validation of the second device identification information is required for a security process using a security protocol;
      send the public key and the second device identification information to a first authentication, authorization, and accounting (AAA) server for validation of the second device identification information, the first AAA server being a separate device from the first device;
      receive a response from the first AAA server, the response including an indication of whether the second device identification information is validated with stored second device identification information for the second device public key, the stored second device identification information being accessible to the first AAA server;
      if the second device identification is validated, verifying the second device private key ownership information to determine if the second device is in possession of a second device private key; and
      if the second device private key ownership information is verified, perform an action for the security process using the security protocol.

2. The first device of claim 1, wherein the action comprises establishing a secure channel with the second device.

3. The first device of claim 1, wherein the logic when executed is further operable to send a request to the second device for secure access to the second device.

4. The first device of claim 1, wherein the logic when executed is further operable to send a first device public key and first device identification information to the second device, wherein the second device is configured to send a request to a second AAA server to validate the first device identification information, wherein upon validation, secure access from the second device is allowed to the first device.

5. The first device of claim 4, wherein the second device is configured to verify first device private key ownership information before or after validation of the first device identification information.

6. The first device of claim 1, wherein the validation is performed after the second device has validated first device identification information associated with a first device public key, wherein the logic when executed on the first device is further operable to send the first device public key and the first device identification information to the second device, wherein the second device is configured to send a request to a second AAA server to validate the first device identification information using the second AAA server, wherein upon validation of the first device, validation of the second device proceeds.

7. The first device of claim 1, wherein the response from the first AAA server includes authorization information.

8. The first device of claim 7, wherein the authorization information comprises information for privilege levels, commands to execute, resources that can be accessed, management views, types of data that can be sent or functions that can be requested.

9. The first device of claim 1, wherein the response includes cache information, the cache information including a time period that the second device public key is valid.

10. The first device of claim 1, wherein the security protocol comprises secure shell (SSH).

11. The first device of claim 1, wherein the security protocol supports uncertified public keys.

12. A method for validating a first device, the method comprising:
   receiving, at a second device, first device private key ownership information, a first device public key, and first device identification information from the first device, wherein validation of the first device identification information is required for a security process using a security protocol;
   sending the first device public key and the first device identification information to a second authentication, authorization, and accounting (AAA) server for validation, the second AAA server being separate from the second device;
   receiving a response from the second AAA server, the response including an indication of whether the received first device identification information is validated with stored first device identification information for the first device public key, the stored first device identification information being accessible to the second AAA server;
   if the first device identification information is validated, verifying, at the second device, the first device private key ownership information to determine if the first device is in possession of a first device private key; and
   if the first device private key ownership information is verified, performing an action for the security process using the security protocol.

13. The method of claim 12, wherein the action comprises establishing a secure channel with the first device.

14. The method of claim 12, further comprising sending a request to the first device for secure access to the first device.

15. The method of claim 12, further comprising:
   sending a second device public key and second device identification information to the first device, wherein the first device is configured to send a request to a first AAA server to validate the second device identification information, and wherein upon validation, secure access to the second device is allowed to the first device.

16. The method of claim 12, further comprising:
   sending second device private key ownership information to the first device, wherein the second device private key ownership information is verified before or after the validation of the second device identification information to determine if the second device is in possession of a second device private key.

17. The method of claim 12, wherein the validation is performed after the first device has validated a second device public key and second device identification information, the method further comprising:

sending the second device public key and the second device identification information to the first device, wherein the first device is configured to send a request to a first AAA server to validate the second device identification information, wherein upon validation of the second device, validation of the first device proceeds.

18. The method of claim 12, wherein the response from the second AAA server includes authorization information.

19. The method of claim 18, wherein the authorization information comprises information for privilege levels, commands to execute, resources that can be accessed, or management views.

20. The method of claim 12, wherein the response includes cache information, the cache information including a time period that the authentication is valid.

21. The method of claim 12, wherein the security protocol comprises secure shell (SSH).

22. A computer-readable storage medium having one or more instructions stored thereon, the one or more instructions being executable by a processor on a first device to perform a validation process for a second device, the validation process comprising:

receiving a second device public key, second device private key ownership information, and second device identification information from the second device, wherein validation of the second device identification information is required for a security process using a security protocol;

sending the public key and the second device identification information to a first authentication, authorization, and accounting (AAA) server for validation of the second device identification information, the AAA server being a separate device from the first device;

receiving a response from the first AAA server, the response including an indication of whether the second device identification information is validated with stored second device identification information for the second device public key, the stored second device identification information being accessible to the first AAA server;

if the second device identification is validated, verifying the second device private key ownership information to determine if the second device is in possession of a second device private key; and if the second device private key ownership information is verified, performing an action for the security process using the security protocol.

23. A first device configured to perform a validation process for a second device, the first device comprising:

at least one processor; and logic encoded in at least one tangible media for execution by the at least one processor, and when executed operable to:

receive a second device public key, second device private key ownership information, and second device identification information from the second device, wherein validation of the second device identification information is a requirement for a security process using a security protocol;

send the second device public key and the second device identification information to a first authentication, authorization, and accounting (AAA) server for validation of the second device identification information, the first AAA server being a separate device from the first device;

receive a response from the first AAA server, the response including an indication of whether the second device identification information is validated with stored second device identification information for the second device public key, the stored second device identification information being accessible to the first AAA server;

determine whether the second device identification information is validated with the received response;

upon determining that the received response is validated, verifying the second device private key ownership information to determine that the second device is in possession of a second device private key; and upon determining that the second device private key ownership is verified, perform an action for the security process using the security protocol.

24. A method for validating a first device, the method comprising:

receiving, at a second device, first device private key ownership information, a first device public key, and first device identification information from the first device, wherein validation of the first device identification information is a requirement for a security process using a security protocol;

sending the first device public key and the first device identification information to a second authentication, authorization, and accounting (AAA) server for the validation, the second AAA server being separate from the second device;

receiving a response from the second AAA server, the response including an indication of whether the received first device identification information is validated with stored first device identification information for the first device public key, the stored first device identification information being accessible to the second AAA server;

determining whether the first device identification information is validated with the received response;

upon determining that the received response is validated, verifying, at the second device, the first device private key ownership information to determine that the first device is in possession of a first device private key; and upon determining that the first device private key ownership is verified, performing an action for the security process using the security protocol.

25. A computer-readable storage medium having instructions stored thereon, the instructions being executable by a processor on a first device to perform a validation process for a second device, the validation process comprising:

receiving a second device public key, second device private key ownership information, and second device identification information from the second device, wherein validation of the second device identification information is a requirement for a security process using a security protocol;

sending the second device public key and the second device identification information to a first authentication, authorization, and accounting (AAA) server for the validation of the second device identification information, the AAA server being a separate device from the first device;

receiving a response from the first AAA server, the response including an indication of whether the second device identification information is validated with stored second device identification information for the second device public key, the stored second device identification information being accessible to the first AAA server;

determining whether the second device identification information is validated with the received response;

upon determining that the received response is validated, verifying the second device private key ownership information to determine that the second device is in possession of a second device private key; and upon determining that the second device private key ownership is verified, performing an action for the security process using the security protocol.

* * * * *